United States Patent [19]

Towns et al.

[11] Patent Number: 4,674,642

[45] Date of Patent: Jun. 23, 1987

[54] PRESSURE-INDICATIVE CONTAINER CLOSURE

[75] Inventors: Edward J. Towns, Morristown; Edward M. Brown, Livingston, both of N.J.; William M. Lester, DelRay Beach, Fla.

[73] Assignee: TBL Development Corporation, Livingston, N.J.

[21] Appl. No.: 766,381

[22] Filed: Aug. 19, 1985

Related U.S. Application Data

[63] Continuation-in-part of Ser. No. 648,059, Sep. 7, 1984.

[51] Int. Cl.$^4$ .............................................. B65D 41/04
[52] U.S. Cl. .................................. 215/230; 215/270; 215/350
[58] Field of Search ............... 215/230, 329, 270, 271, 215/341, 343, 350

[56] References Cited

U.S. PATENT DOCUMENTS

| | | | |
|---|---|---|---|
| 2,068,389 | 1/1937 | Smith | 215/350 |
| 2,458,360 | 1/1949 | Fay et al. | |
| 2,582,489 | 1/1952 | Krueger | 215/270 X |
| 2,634,014 | 4/1953 | Kimber | |
| 3,053,407 | 9/1962 | Lowen | 215/341 |
| 3,458,077 | 7/1969 | Ryan | 215/350 X |
| 3,917,100 | 11/1975 | Dukess | 215/329 |
| 4,442,946 | 4/1984 | MacDonald et al. | 215/230 |
| 4,489,844 | 12/1984 | Breskin | 215/329 |

FOREIGN PATENT DOCUMENTS

| | | | |
|---|---|---|---|
| 610464 | 10/1960 | Italy | 215/270 |
| 1018213 | 1/1966 | United Kingdom | 215/343 |
| 1042571 | 9/1966 | United Kingdom | 215/341 |

*Primary Examiner*—Donald F. Norton
*Attorney, Agent, or Firm*—Robin, Blecker & Daley

[57] ABSTRACT

A container closure includes liner adapted to seal a container having contents under vacuum pressure, and a closure member securing the liner thereto about the liner periphery. An interior extent of the liner is thereby permitted movement relative to the closure member, i.e., is not secured to the closure member. At the point of container initial closure, the liner interior extent is withdrawn under vacuum pressure from its theretofore normal self-biased disposition adjacent the closure member to within the upper neck of the container and is deformed to the extent that initial container pressurization occasions. Upon loss of such initial vacuum pressure, the liner interior extent moves into its normal self-biased disposition adjacent the closure member. Discernment of the disposition of the liner interior extent relative to the closure member is thus indicative of whether the initial vacuum pressure is being maintained or has been lost.

15 Claims, 6 Drawing Figures

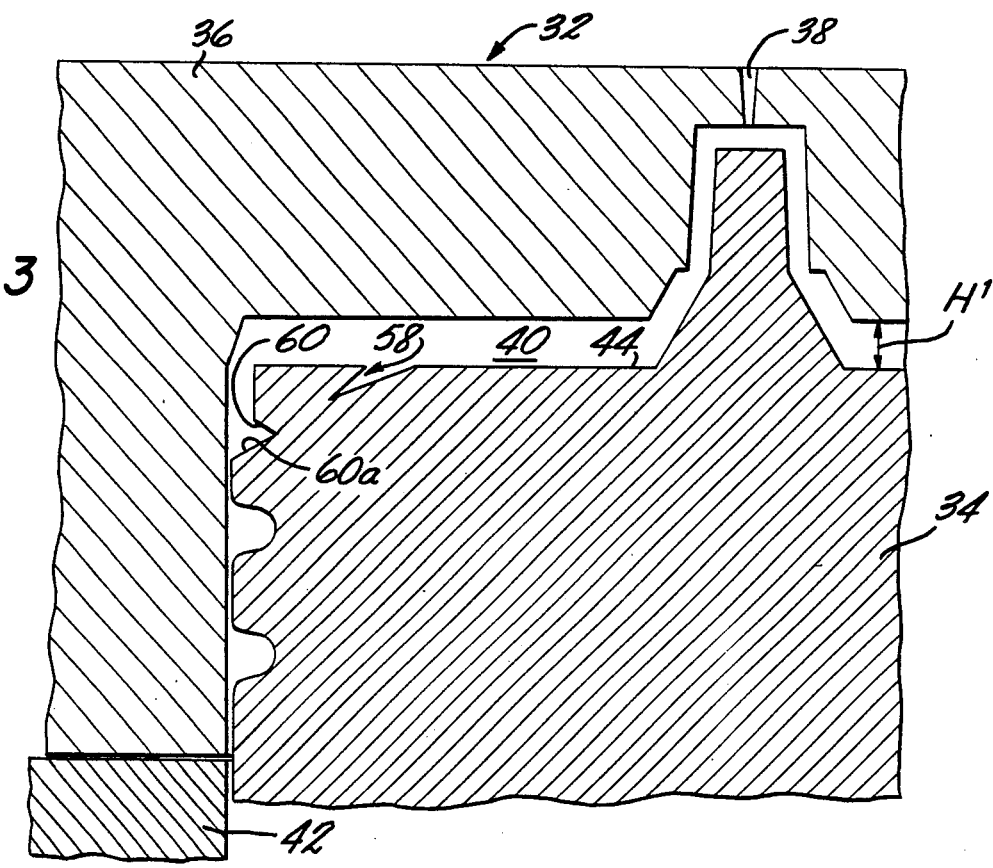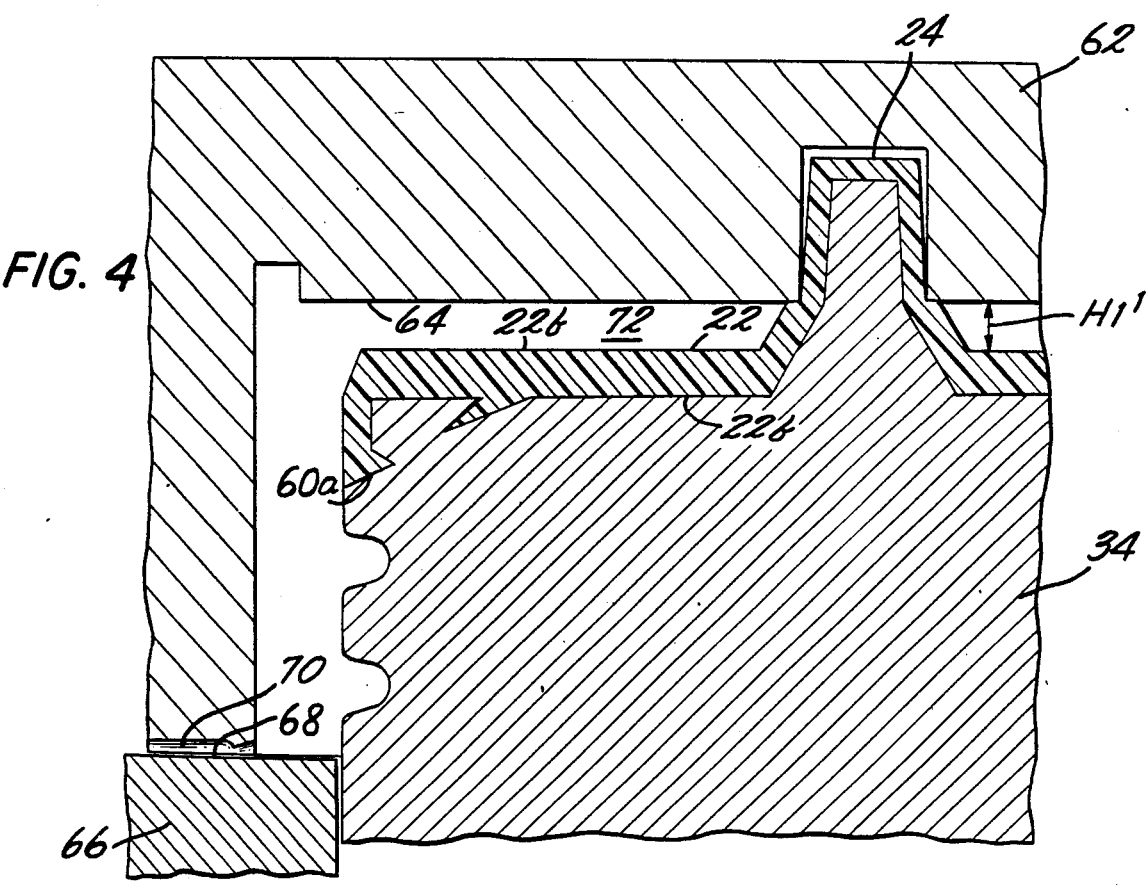

4,674,642

PRESSURE-INDICATIVE CONTAINER CLOSURE

CROSS-REFERENCE TO RELATED APPLICATION

This application is a continuation-in-part of pending and commonly-assigned U.S. application Ser. No. 648,059, filed on Sept. 7, 1984 and entitled "Container Closure, Components Thereof and Method for Making Same".

FIELD OF THE INVENTION

This invention relates generally to closures for containers and pertains more particularly to closures of type providing visible indication of change in vacuum pressure in containers secured thereby.

BACKGROUND OF THE INVENTION

In vacuum product containerization, it is quite desirable for the protection of the manufacturer, the retailer and the consumer to be able to readily determine if the initial vacuum pressure at the point of container closing has been maintained fully to the point of consumer purchase and use. Recent times have illustrated the problems attendant on food vacuum packed in containers pressurized properly at the manufacturing location and which have lost vacuum to the extent of having been subjected to air to create sufficiently high bacteria in packaged foods to cause illness and loss of life. Apart from this most significant problem, there is the further potential monetary loss attending product recall, immediate loss of respect for the product involved and its manufacturer and general wariness as to further purchase thereof with the passage of time.

While various closure structures for output vacuum pressure indication are shown in patents, all are considered by applicants herein to be unduly complex and difficult to manufacture at appropriate cost.

SUMMARY OF THE INVENTION

The present invention has as its primary object the provision of improved vacuum pressure-indicative container closures.

A further object of the invention is the provision of effective methods for producing such closures.

In attaining the foregoing and other objects, the invention provides a closure having an inner member, referred to as a liner, adapted to seal a container having contents under vacuum pressure, and an outer member, referred to as closure member, securing the liner thereto about the liner periphery. An interior extent of the liner is thereby permitted movement relative to the closure member, i.e., is not secured to the closure member to restrict movement between the two parts of the closure. At the point of container initial closure, the liner interior extent is withdrawn, as vacuum pressure is attained, from its theretofore normal self-biased disposition adjacent the closure member to within the upper neck of the container and is deformed to the extent that initial container vacuum pressurization occasions. Upon loss of such initial vacuum pressure, the liner interior extent moves into its normal self-biased disposition adjacent the closure member. Discernment of the disposition of the liner interior extent relative to the closure member is thus indicative of whether the initial vacuum pressure is being maintained or has been lost.

In a particularly preferred embodiment of a closure of the invention, such observation of the liner disposition is effected by providing a passage through the closure member for residence of an indicator in the form of a projection formed atop the liner, the closure member passage being of configuration selected to permit movement of the projection through the closure member and therebeyond upon vacuum pressure loss in the associated container, thus to be viewable above the closure member upper surface. The liner and closure member materials are selected of respective non-adhering plastics and desirably of contrasting colors to enhance the visibility of vacuum pressure loss.

In its process for making such closures, the invention employs practice in part disclosed in the aforementioned parent application (Ser. No. 648,059), and further adapted to the objectives of the present invention. The Ser. No. 648,059 practice provides a closure comprised of a closure member, which is molded on a liner, the liner having a first surface adhering secured to the closure member throughout and a second surface opposite the liner first surface and including a member dependent from the line and configured to effect releasable securement of the liner to a forming member in the course of such molding of the closure member thereon. The Ser. No. 648,059 method thus permits use of different materials respectively for the closure member and liner in accordance with the desired diverse functions thereof. The practice further has benefit in eliminating the customary step of assembling preformed liners with preformed closure members to obtain such performance diversity therebetween.

In the practice of the present invention, the liner material and the closure member material are selected to be mutually non-adhering in the course of the molding operation. Thus, the liner can have the above-noted capability for movement and deformation with respect to the closure member in the liner interior extent. To enable this effect, and yet retain the liner in the closure member molded thereon, the invention introduces further practice of causing the molding material in the closure member forming stage to form liner retaining structure at the periphery of the liner, while at the same time retaining the forming liner on the forming member. The closure structure of the invention above discussed is thus facilitated in an efficient two-stage practice.

The foregoing and other features of the invention will be further understood from the following detailed description of preferred embodiments and practices thereof and from the drawings wherein like reference numerals identify like parts throughout.

DESCRIPTION OF THE DRAWINGS

FIG. 3 is an enlarged partial sectional view showing a forming tool for the liner of the FIG. 1 closure.

FIG. 4 is an enlarged partial sectional view showing a liner as would be formed by the FIG. 3 forming tool resident in a further forming tool for a closure member or cap.

DESCRIPTION OF PREFERRED EMBODIMENTS AND PRACTICES

Figure 1:
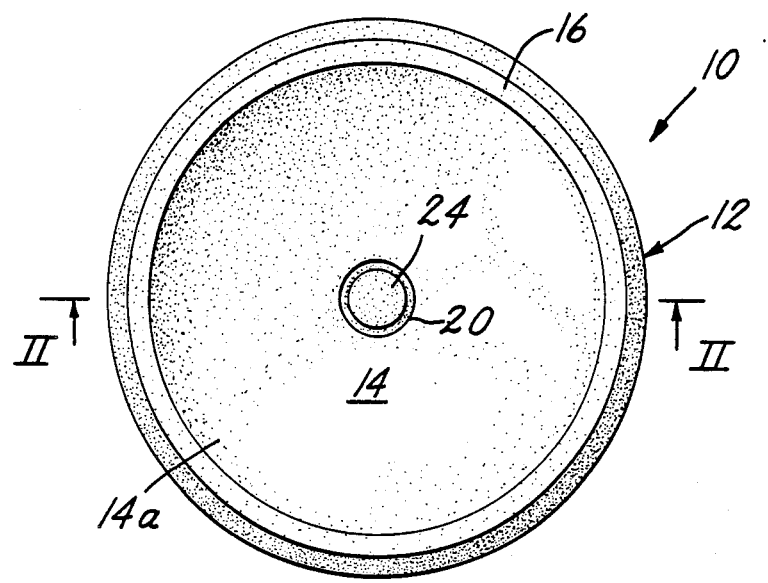
FIG. 1 is a top plan view of a container closure in accordance with the invention.
Figure 2:
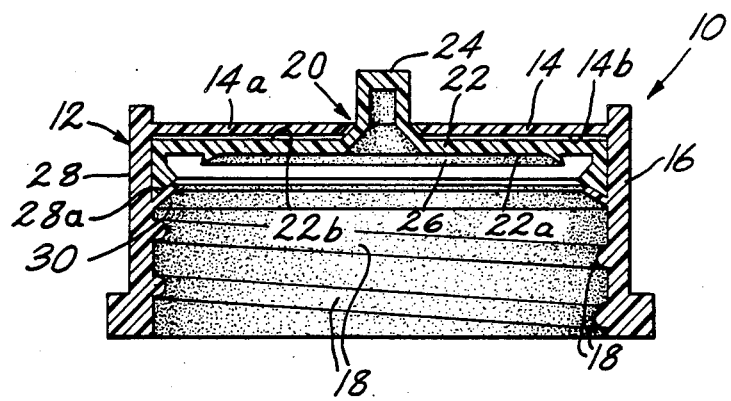
FIG. 2 is a sectional view of the FIG. 1 closure as would be seen from plane II—II of FIG. 1.

Referring to FIGS. 1 and 2, closure 10 includes cap or closure member 12 having a top panel 14 and a skirt 16, interiorly threaded at 18, an opening or passage 20 being formed through top panel 14. Liner 22 of closure 10 has a central projection 24 resident in top panel opening 20 and extending substantially above the upper surface 14a thereof.

Liner 22 further includes, dependent from its lower surface 22a, a sealing member 26 adapted to engage the upper neck surface of a container to seal same. Liner 22 self-biases to its normal disposition upon manufacture and prior to application to a container, as is shown in FIG. 2. Liner 22 defines an annular depending skirt 28 extending downwardly to an end surface 28a, which nests within an annular detent rib or lip 30 formed interiorly of closure member 12 on skirt 16, as by practice discussed below in connection with FIGS. 3 and 4.

Closure member 12 and liner 22 are selected to be of mutually non-adhering plastics and, accordingly, upper surface 22b of liner 22 and undersurface 14b of top panel 14 are not adheringly engaged, i.e., are not bonded to one another, and the interior extent of liner 22 is thus free to move from its illustrated FIG. 2 disposition and deform under the influence of negative pressure thereon in the course of securement of closure 10 to a container.

Referring now to FIG. 3, liner forming tool 32 includes core 34 and liner forming mold half 36, having melt passage 38 extending into cavity 40. Ejector mold half 42 is disposed to position core 34 precisely relative to mold half 36 to define cavity height H. Core 34 has its upper working surface 44 configured with recess 58, corresponding to sealing member 26 for forming same and has side surface 60 configured in lateral V-shape, or any other shape configuration chosen to effectively seal a container. Upon introduction of melt matter and setting of same, separation of core 34 from mold half 36 results in the formation of liner 22 of FIG. 2, nested atop surface 44 of core 34 and releasably secured therewith by reason of retentive action of recess 58 and the upper portion of side surface 60.

The liner forming practice just discussed preferably takes place in a first station of commercially available molding apparatus which includes a rotatable support table indexable by rotation to a second station. While the first station places core 34 in liner mold half 36, the second station places core 34 with formed liner 22 thereon, as depicted in FIG. 4, interiorly of closure member forming mold half 62. Surface 64 of mold half 62 is spaced by height H1 from liner top surface 22b by engagement of ejector mold half 66 and the side end 68 of mold half 62. Melt passage 70 extends into cavity 72.

Figure 5:
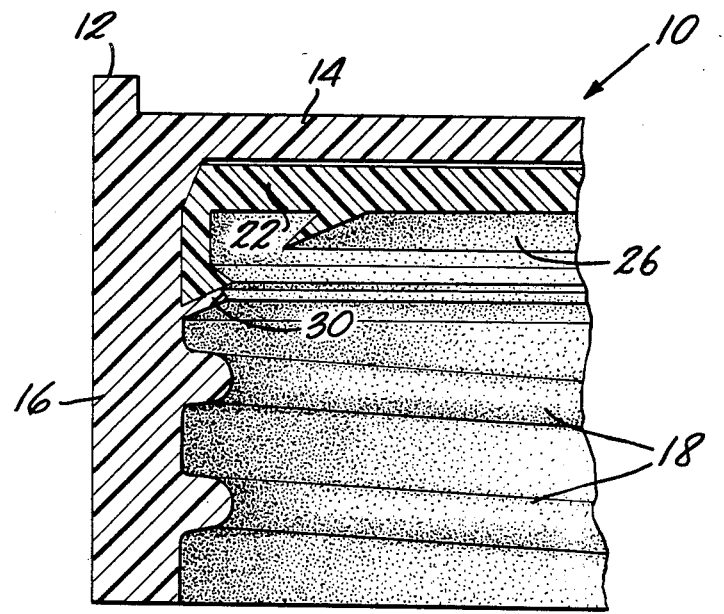
FIG. 5 is an enlarged partial sectional view of a closure as formed in the practices of FIGS. 3 and 4 and stripped from the forming tool of FIG. 4.

In the course of melt conveyance into cavity 72, closure member 12 is formed in secured relation to liner 22 by virtue of the formation of closure member rib 30 in retentive disposition thereto. This occurs by reason of the angulation of the lower extent 60a of core side surface 60, which permits entry of some of the melt matter to work its way beneath the periphery of the formed liner. This structure is best seen in the enlarged partial view of FIG. 5. The first or liner-forming molding material and the second or closure member-forming molding material are selected to be mutually non-adhering, the liner material being a bonding copolymer, such as polypropylene, and the closure member material being a non-bonding copolymer, such as low density polyethylene.

Figure 6:
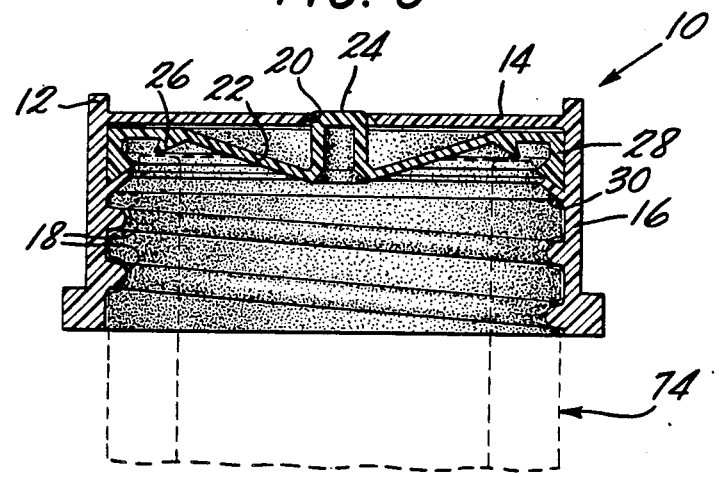
FIG. 6 is a partial enlarged sectional view showing the closure of FIGS. 1 and 2 in assembly with a vacuum-pressurized container, the container being indicated in phantom lines.

Turning now to FIG. 6, closure 10 is shown assembled with container 74, shown in phantom. The vacuum pressurization attending the application of the closure to the container occasions withdrawal of the interior extent of liner 22 from its normal disposition relative to closure member 12 of FIG. 2 and entry thereof into the neck of the container as illustrated. In the course of this action, projection 24 recedes from its prior disposition exteriorly of closure member 12, i.e., well above top panel 14 thereof, to be essentially flush with the top panel upper surface 14a. Sealing surface 26 is in sealing engagement with the top surface of the container neck and threading 18 of the closure is in meshed engagement with counterpart container threading to maintain the assembly. Upon loss of vacuum in the container, the closure will assume the normal configuration thereof in FIG. 2, with projection 24 clearly above the top panel of the closure member, thus providing visible indication to a manufacturer, retailer or consumer of vacuum loss. With the liner material and the closure member materials of respective different contrasting colors, the indication is heightened in visibility.

As will be seen from the foregoing, the invention provides in one aspect thereof a container closure comprising a closure member and a liner supported at its periphery by the closure member and including interior extent normally disposed adjacent the closure member but moveable away from the closure member under the influence of vacuum pressure in the closure, the liner including a projection thereon, the closure member defining a passage therethrough for residence of the projection, the projection being configured to project outwardly of the passage in such normal disposition of the liner and to nest inwardly of the passage upon such movement of the liner interior extent away from the closure member. The closure member is molded upon the liner, the closure member and the liner being constituted by mutually non-adhering materials. The closure member and the liner include respective top panels and depending skirts, the closure member skirt including a peripheral interior lip providing a detent engaging the liner skirt and retaining the liner in the closure member.

In another aspect, the invention will be seen to provide a container closure comprising a closure member and a liner constituted by respective non-adhering materials, the closure member being molded on the liner and defining a detent for mechanical retention of the liner.

In a further aspect, the invention provides a method for making a container closure, comprising the steps of: (a) configuring a forming tool and a first forming tool jacket to define a first cavity for the making of a liner of preselected outline; (b) placing the core in the first forming tool jacket and introducing first molding material into the first cavity, thereby to form a liner on the core; (c) configuring a second forming tool jacket to define, with the core with the formed liner thereon, a second cavity for the making of a closure member of preselected outline; (d) placing the core with formed liner thereon in the second forming tool jacket and introducing second molding material, selected to be non-adhering with respect to the first molding material, into the second cavity, thereby to form such closure member upon the formed liner to provide a closure; and (e) removing the core from the second forming tool jacket and removing the closure from the second forming tool jacket. Such method is practiced in step (d) in manner effecting entry of the second molding material between the formed liner and the forming tool core to define a closure member detent for mechanical retention of the formed liner with the closure member.

Various changes to the described structure and modifications to the described practice may be introduced without departing from the invention. The particularly illustrated preferred embodiments and methods are thus intended in an illustrative and not in a limiting sense. The true spirit and scope of the invention is set forth in the following claims.

We claim:

1. A container closure comprising a closure member having a top panel and a vacuum pressure-responsive liner supported at its periphery by said closure member and including extent interiorly of said liner periphery and normally disposed adjacent said closure member top panel but moveable away from said closure member top panel under the influence of vacuum pressure in said closure, said liner including a projection thereon, said closure member defining a passage therethrough for residence of said projection, said projection being configured to project outwardly of said passage in such normal disposition of said liner and to nest inwardly of said passage upon such movement of said liner interior extent away from said closure member.

2. The invention claimed in claim 1 wherein said closure member is molded upon said liner, said closure member and said liner being constituted by mutually nonadhering materials.

3. The invention claimed in claim 2 wherein said closure member and said liner include respective top panels and depending skirts, such closure member skirt including a peripheral interior lip providing a detent engaging such liner skirt and retaining said liner in said closure member.

4. The invention claimed in claim 3 wherein said closure member and said liner are comprised of respective diverse plastics.

5. The invention claimed in claim 1 wherein said liner defines structure for retention of said liner upon a forming tool in the course of such molding of said closure member thereon.

6. The invention claimed in claim 1 wherein said liner includes a container sealing portion.

7. The invention claimed in claim 1 wherein said liner defines structure for retention of said liner upon a forming tool in the course of such molding of said closure member thereon, such structure being inclusive of a container sealing portion.

8. The invention claimed in claim 1 wherein said closure member and said liner are of respectively different colors.

9. A molded container closure comprising a closure member and a container vacuum pressure-responsive liner constituted by respective non-adhering materials, said closure member being molded on said liner, having a top panel and defining a detent for mechanical retention of the periphery of said liner, said liner including extent interiorly of said liner periphery and normally disposed adjacent said closure member top panel but moveable away from said closure member top panel under the influence of vacuum pressure in said closure, said liner including a projection thereon, said closure member defining a passage therethrough for residence of said projection, said projection being configured to project outwardly of said passage in such normal disposition of said liner and to nest inwardly of said passage upon such movement of said liner interior extent away from said closure member.

10. The invention claimed in claim 9 wherein said closure member and said liner include respective top panels and depending skirts, such closure member skirt including a peripheral interior lip engaging such liner skirt and retaining said liner in said closure member, said lip constituting said detent.

11. The invention claimed in claim 9 wherein said closure member and said liner are comprised of respective diverse plastics.

12. The invention claimed in claim 9 wherein said liner defines structure for retention of said liner upon a forming tool in the course of such molding of said closure member thereon.

13. The invention claimed in claim 9 wherein said liner includes a container sealing portion.

14. The invention claimed in claim 9 wherein said liner defines structure for retention of said liner upon a forming tool in the course of such molding of said closure member thereon, such structure being inclusive of a container sealing portion.

15. The invention claimed in claim 9 wherein said closure member and said liner are of respectively different colors.

* * * * *